Dec. 3, 1968             D. R. HENLEY             3,414,692

COAXIAL LOOP SHOCK SENSOR SWITCH

Filed May 31, 1967

INVENTOR.
DARWIN R. HENLEY
BY
ATTORNEY

United States Patent Office 3,414,692
Patented Dec. 3, 1968

1

3,414,692
COAXIAL LOOP SHOCK SENSOR SWITCH
Darwin R. Henley, Newark, Calif., assignor to the United States of America as represented by the United States Atomic Energy Commission
Filed May 31, 1967, Ser. No. 643,319
8 Claims. (Cl. 200—61.08)

ABSTRACT OF THE DISCLOSURE

A shock sensor switch comprising an insulated wire loop coated with a conductive material which comprises conductor particles disposed throughout, a polymerizable binder matrix which, in addition to coating the wire loop, extends across the loop forming a continuous rigid film which supports the wire loop against deformation by edge-on impact of a shock wave.

Background of the invention

Figure 1:
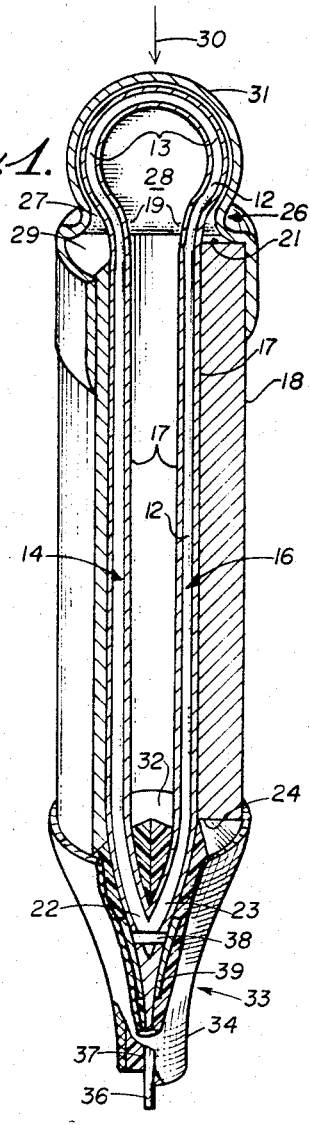

The present invention relates to shock sensor switch pins, and more particularly to a simple, reliable and economical switch assembly having, as a basic component, a looped conductor.

In order to study rapid transient motion, such as shock phenomena propagating away from an explosion, it is necessary to determine its arrival time at various points proximate said detonation source. It is apparent that devices used for the observation of such shock phenomena, due to the very transient nature of the phenomena, must have a very rapid and measurable response thereto.

The prior art

Typical prior art shock detecting sensor switch pins have comprised two bell-shaped conductor members and one bell-shaped insulator member. These members were sandwiched concentrically in conductor-insulator-conductor order around the end of a solid pin, as disclosed in application S.N. 402,663, filed Oct. 8, 1964, now Patent No. 3,287,518, by the present inventor, Darwin R. Henley. A shock wave impinging on the pin head compresses the concentric members, causing rupture of the insulator member and permitting electrical current to flow between the two conductors and be monitored. However, such sensor switch pins require exacting standards to insure a proper spatial relationship within the sandwich. Further, it is desirable in such devices to provide a substantially planar face surface to receive the shock wave and provide a reliable response thereto. A second typical switch in the prior art comprises a very thin flat conductor-insulator-conductor sandwich. Again, on impingement of a shock wave, rupture of the insulator would result with an electrical current, capable of being detected, flowing between the conductors. Such a device offers advantages in size, since its thickness is very slight and results in a very small cross-sectional area which may be disposed in facing relation to the shock wave source. While due to this small cross-sectional area these pins do not significantly disturb the shock wave or detonation pattern in the medium, they are not self supporting and are subject to considerable deformation by the shock wave prior to rupture. The necessity of affixing such a device to a flat surface in the shock wave environment for support prevents rapid and simple disposition of the switch pins under certain circumstances.

The present shock detecting pin switch is of very simple, reliable and economical construction, has minimum cross-sectional area and cross-sectional dimensions and is structurally complete in itself to facilitate insertion in the shock wave environment. The present switch provides these advantages in that it comprises a thin, insulated conductor formed into a loop which is disposed in the medium to be hit edge-on by the shock wave. The loop is stiffened and structurally supported by a hardened film of polymer material extending across the loop. Although very thin, this film provides sufficient strength and rigidity to prevent distortion of the loop by the edge-on shock action. Conductive means are disposed at least on the loop periphery to also at least partially rigidize the loop and to provide, on impingement of a shock wave, a conductive path with said conductor loop to permit monitoring of an electrical current therealong.

A major advantage of the present switch is that it is very readily manufactured by dipping a wire loop into a bath of certain polymerizable materials which will inherently form the supporting film by virtue of their viscosites and surface tensions as set forth infra.

Accordingly, it is a primary object of the present invention to provide a shock sensor switch having minimal cross-sectional area and minimal cross-sectional dimensions presented to an impinging shock wave front to be detected.

A further object of the present invention is the provision of a reliable shock sensor switch which is structurally self-supporting to further facilitate insertion into a shock wave environment.

A still further object of the present invention is the provision of a shock sensor switch which is of very simple and economical construction in view of the large number of such switches employed in destructive testing.

Figure 2:
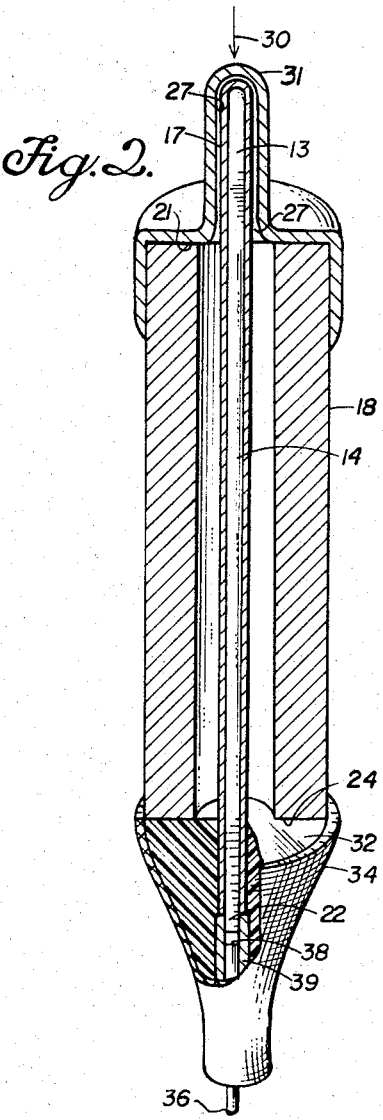

Other objects and advantageous features of the invention will become apparent by consideration of the following description and accompanying drawing, wherein:

FIGURE 1 is an enlarged sectioned view of a preferred embodiment of the present shock detecting sensor switch; and FIGURE 2 is also an enlarged sectioned view of the same preferred embodiment of the present sensor switch, but which is taken at 90° to the view of FIGURE 1 to more clearly show the construction details of the switch.

To obtain the objects set forth above, the present shock sensor switch assembly comprises an elongated, very thinly electricaly insulated conductor of very small cross-sectional area which is doubled back on itself to form a loop. Means are disposed at the base of the conductor loop to provide structural support for the loop. Outer electrically conductive means are disposed in intimate relation to the insulator material of said conductor loop around the periphery of said loop to at least partially rigidize the conductor loop and to be electrically conductive with said loop conductor on destruction or partial destruction of said insulation. Connector means are separately disposed in electrically conductive relation to each of said loop conductor and said conductive means to dispose an electrical potential and to connect appropriate monitoring apparatus thereacross. In operation, the switch asembly is disposed in a shock wave environment to expose the upper portion of the loop to the shock wave or other high velocity impact phenomena to be observed upon the conductor means disposed on said insulated conductor loop. Before the partially rigidized loop is substantially deformed by the impinging shock wave, the insulator material is crushed, ruptured or otherwise destructed or partially destructed to permit electrical current to flow between said loop conductor and said outer conductive means. This closing between the switch conductors is conveniently detectable by the said monitoring apparatus to accurately determine the arrival time of the shock wave at the sensor pin location. Time resolution of the shock wave arrival time with a preferred embodiment of the present sensor switch is as small as of the order of $10^{-8}$ seconds.

To describe a preferred embodiment of the present invention in detail and with reference to FIGURES 1 and 2, shock sensor switch 11 comprises an elongated ductile conductor 12 of very small cross-sectional dimensions. For example, conductor 12 may be a wire, rod or bar having very small dimensions and formed from a material such as copper, aluminum, steel, nickel, or metal alloys of these and other metals. Preferably, conductor 12 is copper wire having a diameter of approximately 0.002 inch. Conductor 12 is doubled back on itself to form a small loop 13 and conductor legs 14 and 16 extending therefrom. A very thin continuous coating 17 of insulator material is disposed at least on the conductor loop 13 surface, and preferably along the entire length of conductor 12. Insulator coating 17 is preferably of a highly dielectric material, either inorganic or organic, with a thickness of the order of 0.001 inch or less, i.e., down to a few angstroms. Polyethylene terephthalate (trade name Mylar), linear polyethylene, polypropylene, or other excellent organic dielectric materials, or inorganic materials, e.g., mica, composite ceramic, etc., may be used. However, insulator coating 17 is preferably vinyl acetate (trade name Formvar) of a thickness of approximately 0.00025 inch. Copper wire, as preferred for conductor 12, is commercially available for electronic purposes with such an insulative coating.

Conductive means 18 provides an electrical signal return path from conductor 12 (discussed infra) and serves to structurally support conductor loop 13 such that the disposition of loop 13 may thereby be maintained. Preferably, support means 18 comprises a very small elongated tube through which conductor legs 14 and 16 extend such that the base 19 of loop 13 rests on a first end 21 of tube 18. Ends 22 and 23 respectively of conductor legs 14 and 16 protrude from a second end 24 of tube 18. Support tube 18 is preferably a conductive material, e.g., stainless steel hypodermic tubing, which is electrically insulated from conductor loop 13 and conductor legs 14 and 16 by insulative coating 17 thereon. Tube 18 may have exemplary dimensions of: outside diameter—0.022 inch; inside diameter—0.012 inch; length—approximately two inches.

It is necessary to provide a second conductor by which electrical current may flow from conductor 12 on the destruction of insulative coating 17. Further, in view of the small diameter and ductility of loop 13, it is necessary to at least partially rigidize loop 13 such that an impinging shock wave will destruct insulative coating 17 prior to any substantial deformation of loop 13. These functions, which are described further in the operation of the invention, infra, to provide an accurate time response of the switch, are provided by electrically conductive means 26. Means 26 are disposed in intimate relation to insulative coating 17 at least around the periphery of loop 13. For purposes of conducting the electrical signal, means 26 may simply comprise a conductive metal, e.g., copper, steel, nickel, aluminum, etc. However, to facilitate switch assembly and to firmly fix loop 13 with relation to support tube 18, means 26 further comprises a film 27 of conductive paint or plastic. Conductive film 27 around insulative coating 17 of loop 13. polymerized or evaporation-hardened from a liquid. Thus, loop 13 end of switch assembly 11 may be dipped in such a liquid having a preselected viscosity. The liquid then hardens to preferably form continuous and conductive film 27 around insulative coating 17 of loop 13. To further rigidize loop 13 and secure it with relation to support tube 18, the viscosity of said liquid is selected such that conductive film 27 extends continuously across gap 28 of loop 13, and also forms a globule 29 in end 21 of tube 18 around conductor loop base 19. The liquid from which conductor film 27 is formed may include matrix material of, e.g., epoxy, polyvinyl acetate, polyurethane, polyvinyl alcohol, etc., and a conductive metallic powder, e.g., silver, gold, copper, aluminum, etc., uniformly dispersed therein in sufficient quantity to render the resultant film electrically conductive. Preferably, said liquid is an epoxy base having approximately 20–40 weight percent of finely divided silver powder dispersed therein, and having an initial viscosity, during said dipping operation, of approximately 5,000–10,000 centipoise. To provide additional mass which may be driven through insulator 27 and into conductive relation with 12 by means of impinging shock wave 30, conductive means 26 also comprises electrically conductive metal film 31 which is disposed in intimate conductive realtion over film 27 around loop 13. To further insure a reliable electrical path from film 27, metal film 31 extends over end 21 of support tube 18 to be in electrically conductive relation thereto. Metal film 31 may be of silver, gold, copper, aluminum, etc. However, film 31 is preferably copper, electroformed in place to a depth, at least around the periphery of loop 13, of approximately 0.002 inch.

To further secure conductor legs 14 and 16 with respect to support tube 18, binder, preferably epoxy, is disposed as globule 32 at end 24 of tube 18 around legs 14 and 16.

To dispose an electrical potential and appropriate monitoring apparatus across conductor wire 12 and means 26, connectors 33 are disposed in separate electrically conductive relation thereto. Preferably, connectors 33 comprise a coaxial cable having coaxial ground braid 34, coaxial lead 36 and appropriate electrical insulation 37 therebetween, capable of maintaining a voltage holdoff of, e.g., 500 volts, between braid 34 and lead 36. Ends 22 and 23 of conductor legs 14 and 16 are brought together and soldered to coaxial lead 36 at joint 38. An insulative sleeve 39, e.g., of polyethylene, is disposed around joint 38 to insulate it from ground braid 34. Sleeve 39 preferably extends to at least join with insulative coating 27 on conductor legs 14 and 16, and with insulator 37 of coaxial cable 33. Coaxial ground braid 34 is soldered in electrically conductive relation to end 24 of support tube 18.

Although not a part of the present invention, it is noted that the distal end (not shown) of coaxial cable 33 would have means, e.g., a low current DC line source (not shown), disposed thereacross to impress an electrical potential of, e.g., 300 volts, between ground braid 34 and coaxial lead 36, and accordingly between wire conductor 12 and conductor means 26 in respective conducting relation therewith. Monitoring apparatus (not shown) disposed across said distal end of coaxial cable 33 may typically comprise an oscilloscope (not shown), used as a current flow indicator, connected with a resistor (not shown) in parallel with braid 34 or lead 36 of coaxial cable 33 and utilizing a DC blocking capacitor to eliminate DC current flow therethrough as contemplated in conventional practice.

In operation, sensor switch assembly 11 (or a plurality thereof) is disposed at a predetermined location to determine the arrival time of an impinging shock wave 30. Preferably, switch 11 is disposed to receive shock wave 30 axially along switch 11 and upon conductor means 31 disposed over conductor loop 13. Voltage imposing means and monitoring apparatus are connected to switch 11 as described above.

When shock wave 30 impinges on conductor 31, loop 13, by its rigidized nature, tends to resist deformation at least until shock wave 30 drives the mass of conductive metal 31 and conductive film 27 to rupture or otherwise at least partially destruct insulative coating 17 around loop 13. On the destruction of insulative coating 17, conductor 12 and conductor means 26 are placed in electrically conductive relation such that the electrical voltage imposed thereacross produces a simultaneous current flow from lead 36 to conductor 12, conductive films 27 and 31, conductive support tube 18 and ground braid 34. Said current flow may be detected by said monitoring apparatus on the order of $10^{-8}$ seconds from rupture of insulator 17, i.e., before the shock wave causes partial or total destruction of switch assembly 11.

Thus, the present invention provides a surprisingly simple and reliable assembly which may be readily inserted into a shock wave environment to determine the propagative characteristics thereof, with substantially no effect on said propagative characteristics. Further, the simplicity and economy of both materials and methods of construction add to its desirability and effectiveness in such destructive testing.

It is to be understood that, although the present invention is described with respect to a single embodiment and possible variations therein, the scope of the present invention is not limited by the above description and drawings.

I claim:
1. In a shock sensor switch for obtaining a fast signal response to the arrival of a shock wave, the apparatus comprising:
 (a) a ductile, electrically conductive wire doubled back on itself to form a loop and two legs, said wire having a thin insulative coating, said wire disposed to receive said shock wave to be detected upon the periphery of said wire loop distal said wire legs;
 (b) means structurally supporting said legs of said wire loop;
 (c) electrically conductive metal means disposed at least on the periphery of said wire loop to at least partially rigidize said wire loop and to provide an electrically conductive short circuit with said wire loop on impingement of said shock wave; and
 (d) connector means disposed in electrical contact with said conductive wire and said conductive metal means for introducing an electrical potential thereacross and for connecting sensing equipment therebetween to sense an electrical short circuit between said wire loop and said conductive metal means.

2. The apparatus of claim 1 wherein said loop support means is an electrically conductive tube having first and second ends, said wire legs being disposed through said first end and projecting from said second end such that said wire loop just extend from and rests upon said first end.

3. The apparatus of claim 2, wherein said conductive metal means is a metal paint disposed to completely coat said wire loop extending from said support tube, to form a loop-rigidizing film across said wire loop gap and to form a globule at the first end of said support tube to maintain the disposition of said wire loop thereto.

4. The apparatus of claim 3, further defined by an electrically conductive metal film disposed to cover and be in electrical contact with said metal paint and at least a portion of said first end of said support tube.

5. The apparatus of claim 4, wherein:
 (a) said conductive wire is copper with a continuous insulative coating of vinyl acetate of a thickness of approximately a few angstroms to 0.001 inch;
 (b) said metal paint is a conductive silver paint; and
 (c) said metal film is electroformed copper.

6. The apparatus of claim 4, wherein said connector means comprises a first connector disposed in electrical contact with an uninsulated portion of said wire legs extending from said second end of said support tube, a second connector insulated from said first connector and disposed in electrical contact with said support tube.

7. The apparatus of claim 6, further defined in that said connector means is a coaxial cable, said first connector is a coaxial lead electrically joined to said wire legs, insulator material being disposed around said joint, and said second connector is a coaxial ground braid electrically joined to said support tube and separated from said wire legs-coaxial lead joint by said insulator material.

8. The apparatus of claim 5, wherein:
 (a) said wire has a diameter of approximately 0.002 inch, said wire loop having an outside diameter of approximately 0.022 inch; and
 (b) said support tube is of stainless steel with an inside diameter of approximately 0.012 inch and an outside diameter of approximately 0.022 inch.

References Cited

UNITED STATES PATENTS

| | | | |
|---|---|---|---|
| 2,716,229 | 8/1955 | Wehrmann et al. | 200—61.08 |
| 3,230,327 | 1/1966 | McDowell | 200—61.08 |
| 3,287,518 | 11/1966 | Henley | 200—61.08 |

ROBERT K. SCHAEFER, *Primary Examiner.*

H. O. JONES, *Assistant Examiner.*